US009928516B2

(12) United States Patent
Weller

(10) Patent No.: US 9,928,516 B2
(45) Date of Patent: Mar. 27, 2018

(54) SYSTEM AND METHOD FOR AUTOMATED ANALYSIS OF DATA TO POPULATE NATURAL LANGUAGE DESCRIPTION OF DATA RELATIONSHIPS

(71) Applicant: NICE-SYSTEMS LTD., Ra'anana (IL)

(72) Inventor: Suzanne Catherine Weller, London (GB)

(73) Assignee: NICE LTD., Ra'anana (IL)

( * ) Notice: Subject to any disclaimer, the term of this patent is extended or adjusted under 35 U.S.C. 154(b) by 898 days.

(21) Appl. No.: 14/340,617

(22) Filed: Jul. 25, 2014

(65) Prior Publication Data

US 2015/0186334 A1    Jul. 2, 2015

Related U.S. Application Data

(60) Provisional application No. 61/921,765, filed on Dec. 30, 2013.

(51) Int. Cl.

| | | |
|---|---|---|
| *G06F 17/18* | (2006.01) | |
| *G06F 19/00* | (2018.01) | |
| *G06Q 30/02* | (2012.01) | |
| *G06F 17/30* | (2006.01) | |
| *G06F 17/24* | (2006.01) | |

(52) U.S. Cl.
CPC ....... *G06Q 30/0201* (2013.01); *G06F 17/248* (2013.01); *G06F 17/30* (2013.01)

(58) Field of Classification Search
CPC .... G06F 17/248; G06F 17/30; G06Q 30/0201
See application file for complete search history.

(56) References Cited

U.S. PATENT DOCUMENTS

| | | | | |
|---|---|---|---|---|
| 7,953,219 | B2* | 5/2011 | Freedman | G06Q 30/02 379/265.06 |
| 8,700,597 | B2* | 4/2014 | Gupta | G06F 8/51 707/708 |
| 2002/0183965 | A1* | 12/2002 | Gogolak | G06F 19/363 702/179 |
| 2005/0159896 | A1* | 7/2005 | Ishikawa | G06F 19/20 702/19 |
| 2005/0171746 | A1* | 8/2005 | Thalhammer-Reyero | G05B 17/02 703/2 |
| 2007/0050149 | A1* | 3/2007 | Raskin | G06Q 30/02 702/19 |
| 2009/0012826 | A1* | 1/2009 | Eilam | G06Q 30/02 705/7.31 |

(Continued)

*Primary Examiner* — David M Gray
*Assistant Examiner* — Geoffrey T Evans
(74) *Attorney, Agent, or Firm* — Pearl Cohen Zedek Latzer Baratz LLP

(57) ABSTRACT

A computer implemented method and system for analyzing a set of data records is provided. Each data record comprises a value for each of a plurality of variables and the method comprises receiving a selection of a variable of interest from the plurality of variables; analyzing values in the data records of at least one variable of the plurality of variables other than the variable of interest; and using the analysis to create a statistical description of said at least one variable. The statistical description is then used to populate at least one template natural language description of a relationship between the variable of interest, or a value or range of values of the variable of interest, and the variable to which the statistical description applies.

11 Claims, 11 Drawing Sheets

(56) References Cited

U.S. PATENT DOCUMENTS

| | | | | |
|---|---|---|---|---|
| 2009/0044096 A1* | 2/2009 | Gupta | ................ | G06F 8/51 |
| | | | | 715/230 |
| 2009/0076847 A1* | 3/2009 | Gogolak | ................ | G06F 19/24 |
| | | | | 705/2 |
| 2014/0100846 A1* | 4/2014 | Haine | ................ | G06F 17/248 |
| | | | | 704/9 |
| 2014/0100901 A1* | 4/2014 | Haine | ................ | G06F 17/248 |
| | | | | 705/7.11 |

* cited by examiner

SYSTEM AND METHOD FOR AUTOMATED ANALYSIS OF DATA TO POPULATE NATURAL LANGUAGE DESCRIPTION OF DATA RELATIONSHIPS

CROSS REFERENCE TO RELATED APPLICATIONS

This application claims the benefit of prior U.S. Provisional Application Ser. No. 61/921,765 filed Dec. 30, 2013 which is incorporated herein by reference in its entirety.

BACKGROUND

Many businesses collect large amounts of data about their customers. They are interested in finding the patterns of behavior in these datasets which will help them to understand their customers and which can be exploited in order to improve customer experience, inform business strategies or increase revenue.

In order make sense of such datasets, it is common to build statistical models or to perform statistical analyses. However these models are often hard to interpret, particularly for an audience with no specialist knowledge. Furthermore, it is often necessary to explore the model and the dataset with a specific hypothesis in mind in order to understand what has been learned. This is a laborious process and is limited by the extent of the initial hypotheses the user is able to imagine.

SUMMARY

Some embodiments of the present invention provide method of analyzing a set of data records. Each data record may comprise a value for each of a plurality of variables. Embodiments may comprise receiving a selection of a variable of interest from the plurality of variables and analyzing values in the data records of at least one variable of the plurality of variables other than the variable of interest. In some embodiments the analysis may be used to create a statistical description of said at least one variable. In some embodiments the statistical description may be used to populate at least one template natural language description, or sentence. This may be a description of a relationship between the variable of interest, or a value or range of values of the variable of interest, and the variable to which the statistical description applies. The method may be implemented using a computer. One or more of the operations of receiving, analyzing, creating and populating may be performed using one or more computer processors. According to embodiments of the invention, the analysing may be carried out on multiple variables other than the variable of interest. The template natural language description may then be populated for respective ones of said multiple variables. According to embodiments of the invention, the analysing may comprise determining whether said at least one variable is correlated with the variable of interest. The strength of the correlation may be determined for each variable determined to be correlated with the variable of interest According to embodiments of the invention, the population of a template natural language description may be performed for a plurality of variables in the set of data records other than the variable of interest. The method may further comprise presenting the populated natural language descriptions for the plurality of variables together with information relating to the strength of the correlation. In some embodiments, the populated natural language descriptions may be presented as a list ranked by strength of correlation.

In some embodiments, a template to be populated may be selected from a set of templates according to one or more rules. Each of the one or more rules may be associated with at least one of the plurality of variables other than the variable of interest. The analysing may be carried out on multiple variables other than the variable of interest. Multiple rules may be available for at least one of the multiple variables.

According to some embodiments, a template may comprise a natural language description and one or more placeholders, each placeholder to be populated with names of one or more of the plurality of variables and values of one or more of the plurality of variables.

In some embodiments, the data records may be allocated to respective groups. For example different groups may correspond to different values or ranges of values of the variable of interest. Additionally or alternatively, different groups may correspond to different values or ranges of values of a variable other than the variable of interest. The creation of a statistical description may be performed for at least one of the respective groups.

Some embodiments of the invention provide a system for the analysis of data records. The system may comprise one or more processors configured to allocate the data records to respective groups, each group corresponding to a different value or range or values of a variable of interest; and for at least one group, create a statistical description of at least one variable of the plurality of variables other than the variable of interest. The statistical description may be used to populate a template natural language description of a relationship between the variable of interest and the variable to which the statistical description applies.

In some embodiments, the one or more processors may be configured to analyse the data records and determine whether any of the plurality of variables other than the variable of interest is correlated with the variable of interest. The creation of a statistical description may be carried out for variables which are correlated with the variable of interest.

In some embodiments, the one or more processors may be configured to determine the strength of correlation for each variable determined to be correlated with the variable of interest.

In some embodiments, the one or more processors are configured to selecting a template to be populated from a set of templates according to one or more rules.

In some embodiments, for at least one of the plurality of variables the one or more processors are configured to select a template from multiple templates according to one or more rules.

Embodiments of the system may comprise an interface configured to receive a selection of a variable of interest from the plurality of variables.

Some embodiments of the invention provide a computer implemented method of analysing a set of data records, wherein each data record comprises a value for each of a plurality of variables. The method may comprise receiving an indication of a variable of interest from the plurality of variables and analysing values in the data records of a plurality of the variables other than the variable of interest. The analysis may be used to create statistical descriptions of said variables other than the variable of interest. The statistical descriptions may be used to add data to a chart indicating the predictive power of the variables other than the variable of interest for the variable of interest or for values of the variable of interest.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

DETAILED DESCRIPTION OF EMBODIMENTS OF THE PRESENT INVENTION

Figure 1:
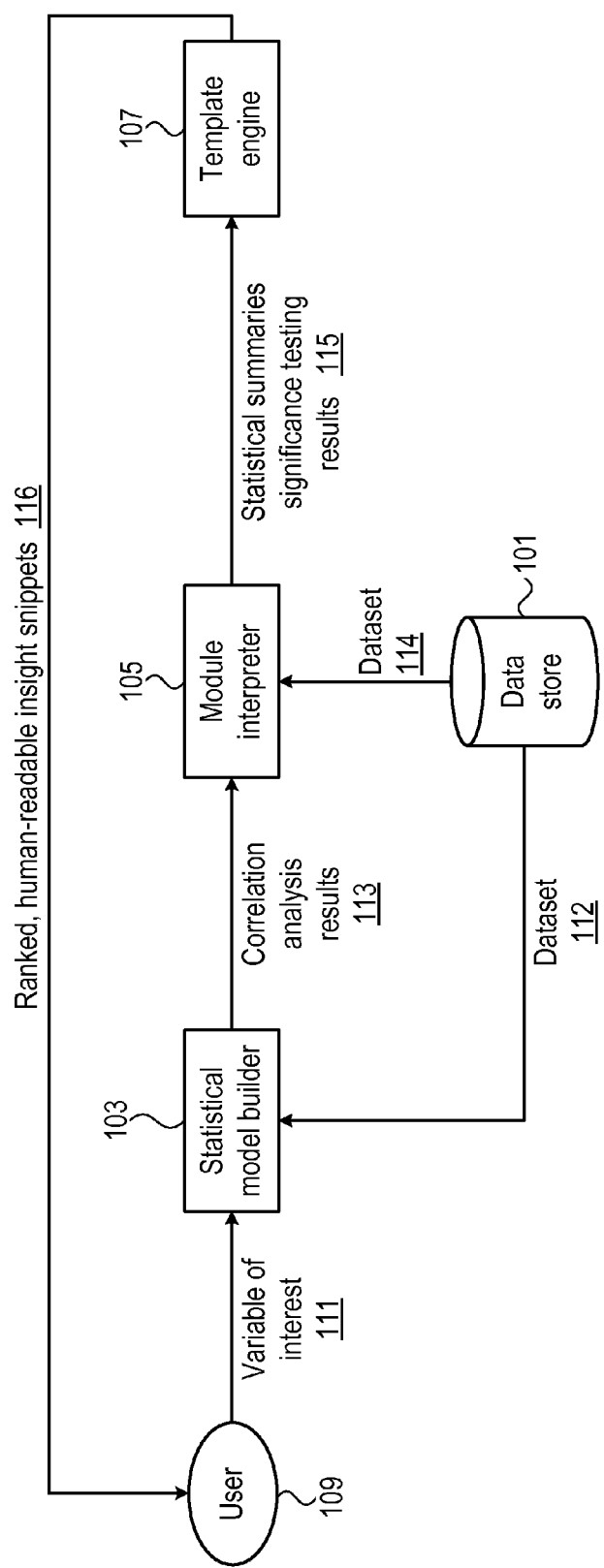
FIG. 1 is a block diagram showing the basic components of a system according to some embodiments of the invention.

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "storing", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of this invention may be used to automate a process which analyses a dataset, identifies significant patterns and then presents these patterns to a user in a meaningful form, e.g. human-readable sentences (referred to as "snippets" or "insight snippets") which are ranked by a strength metric. The insight snippets may for example be presented in natural language (e.g., human spoken language) rather than mathematical expressions or equations.

Prior to setting forth a detailed discussion of embodiments of the invention, it may be helpful to set forth definitions of certain terms that will be used hereinafter.

Variable of Interest:

As used in the following this refers to a variable entered by a user, usually a variable that a user wishes to understand. According to embodiments of the invention this is assumed to be dependent on one or more other variables (although this may not prove to be the case) and is therefore also referred to as a dependent variable.

Independent Variables:

In the following this expression is used to refer to variables other than the variable of interest. These may be independent of the variable of interest but this is not necessarily the case. They may be dependent on factors other than the variable of interest.

Nominal Variables:

These are also referred to as "categorical variables". The possible values of this variable form a set of categories, but there may or may not be any intrinsic ordering to the categories. For example, the variables Gender, City and Occupation are all nominal variables. Both independent and dependent variables may be nominal variables.

Continuous Variables:

These are variables which have numerical values and can be measured along a continuum. For example, Age, Page View Count, Mean Session Length, Time since last purchase, are all continuous variables. Both independent and dependent variables may be continuous variables.

Indicator Variables:

The term "indicator variable" sometimes qualified as "binary indicator variable" is used in the following to refer to one of a set of indicator variables produced from one or more (usually one) nominal variable. For example the nominal variable City (which has values London, Paris, San Francisco, etc.) may be transformed into a set of variables such as "Is the City London?", "Is the City Paris?", "Is the City San Francisco" etc. These may be binary variables and each takes the value 0 or 1.

eg:

Customer ID, City, Is City London?, Is City Paris?, Is City San Francisco?

1, London, 1, 0, 0

2, Paris, 0, 1, 0

3, San Francisco, 0, 0, 1.

Insight Snippet

A sentence in natural or human-readable language, as opposed to mathematical language such as equations, supplying meaningful and insightful information about patterns in a dataset. This may be in any spoken language.

Independent variables, if truly independent, are not affected by changes in any of the other variables in the dataset. Examples of independent variables may include but are not limited to gender, city of residence, occupation. Dependent variables are variables that are affected by changes in the variable on which they depend. For example, mean session length may depend on city of residence and therefore mean session length is a dependent variable. Whether or not a particular variable is independent or dependent will depend on the dataset and the other variables in it. Also the dependency of some variables on others may not be self-evident and may require experimentation to determine. In the present description the term "dependent variable" is used for example to refer to a variable that is desired to be understood in terms of another, e.g. independent variable.

Thus an independent variable may be defined, for the purpose of some embodiments of the invention, as a variable that is being manipulated, e.g. in an experiment in order to observe the effect on a dependent variable. More generally, according to embodiments of the invention, a set of independent variables is examined in order to observe how the values of these independent variables effects (is correlated with, or predicts) the value of a dependent variable.

For example, a method according to the invention may commence with a set of independent variables such as Gender, City of Residence, Occupation, Page View Count, Mean Session Length and Time since last purchase and a dependent variable like Product Purchased. The purpose of the method may be to find out which independent variables predict the dependent variable outcome. For example the age and online browsing behavior of the customer may be predictive of the type of financial product they are interested in. This dependency may be used to provide insights into the data such as: "Older customers are more likely to purchase investment products", "Customers who have used the mortgages calculator are more likely to purchase a fixed-rate mortgage".

A dataset which may be analyzed according to an embodiment of the invention may consist of many variables and many records. In some embodiments each record comprises a set of values for each of a number of variables. For each record, a value may be supplied for each of the variables. Table 1 shows an example dataset containing just 5 records. Each record in this example represents a customer, and contains a value for each of five variables. The variables and associated values may describe that customer's behavior. In this example the variables are:

whether or not the customer is a subscriber e.g. to a particular service
the number of interactions of the customer, e.g. with a contact or call center
the interest group in which the customer has been categorized
customer age
product purchased.

Other variables may be used. Datasets containing many more records may be used to perform statistical analysis.

TABLE 1

Example dataset containing customer records

| customer id | is subscribed | interaction count | interest group | age | product purchased |
|---|---|---|---|---|---|
| 3543457 | true | 5 | mortgages | 34 | mortgage |
| 2345432 | false | 63 | credit card | 22 | credit card |
| 6524544 | true | 44 | credit card | 46 | loan |
| 4353467 | true | 0 | savings | 41 | current account |
| 1343564 | false | 49 | loan | 19 | loan |

Users, e.g. those whose customers the records relate to, will typically be interested in a handful of key variables (referred to as variables of interest) which may be a subset of the variables represented in the data set. In the example of customer behavior typical variables of interest could be the total spend of a customer (not shown in the above table), the products they purchase, or the time until they next return (also not shown in the above table). An embodiment of system according to the invention may allow a user to select a single variable of interest and then view snippets describing how other variables in the system are correlated with this variable of interest.

According to embodiments of the invention a record may comprise for example one value for each of the variables. Alternatively according to embodiments of the invention a record may comprise multiple values for one or more variables. Each of the multiple variables may correspond to a different context of the variable. For example if the variable is "interaction count" a record may include different values determined over different time periods.

Implementing an embodiment of the invention, a user of the system may select a particular variable of interest. The system may analyze how the other variables in the system (these may be for example independent variables defined below) are correlated with the variable of interest. It may then rank the variables by the strength of the correlation. For each significantly correlated variable, the system may generate a set of meaningful, human-readable sentences to describe how the variable is correlated. As noted above these sentences are referred to in the following as "snippets" or "insight snippets".

In the following, operations in flow charts are described with reference to specific variables used as illustrative examples. It will be appreciated that the same operations may be performed using other variables and that these examples are not limiting on the scope of the invention.

1. Main Components of an Embodiment of System

The main components of one possible embodiment of a system according to the invention are shown in FIG. 1. These components may be implemented in software (e.g. one or more computer processors executing software) or a combination of hardware (e.g., dedicated circuitry) and software. The software may run on a general purpose computer, an example of which is described further below, and the hardware may be installed in the computer. Alternatively the components may be distributed over multiple computing devices. The components of the embodiment of FIG. 1 comprise:

Data store 101: persistent storage for the dataset, this can be a simple file with a format similar to table 1 for example in the form of a comma separated variable "csv" file, or any other suitable data storage implementation such as a database or key-value store.

Statistical model builder 103: this component is configured to read the dataset and build a statistical model in order to determine which variables are correlated with the variable of interest and what are the strengths of these correlations.

Model interpreter 105: this component is configured to split the dataset into groups corresponding to different values of the variable of interest. Statistical summaries are calculated for each of the groups, and significance tests are used to measure differences between the groups.

Template engine 107: this component is configured to take the statistical summaries and significance testing results, then populate (e.g. insert data into) templates, charts or other data structures to produce meaningful, human-readable descriptions of the significant differences between the groups. Appropriate templates are selected according to rules implemented by the template engine.

User interface 109: this component is configured to receive user input such as the indication or selection of a variable and to display information to a user such as the descriptions generated by the template engine 107. The user interface may comprise any user interface known in the art of communication between a computing device and a user, including for example a touch screen display.

The operations of the main components according to an embodiment of the invention are described in more detail below.

1.1. Example of Flow of Data

A possible flow of data according to an embodiment of the invention is shown in FIG. 1. The paragraphs below refer to each numbered arrow on the figure.

111. The user selects a variable of interest which is passed to the statistical model builder. For a customer behavior data set this could be the last product purchased by the customer. According to embodiments of the invention, the selection or indication may be made by the user using any kind of input device, e.g. personal computer, for example via a graphical user interface "GUI" (e.g., via input device 735 of FIG. 7). Thus a system according to an embodiment of the invention receives the selection of a variable, for example from a user but possibly also from another source, such as another machine e.g. implementing a monitoring application or some other automated system.

112. The statistical model builder 103, for example in response to the selection of a variable, reads the dataset from the data store 101 and then determines which variables are correlated with or predictive of the variable. According to some embodiments of the invention, the model builder 103 uses a standard modeling technique. Examples of modeling techniques include but are not limited to linear regression, logistic regression, decision tree or Pearson correlation analysis. This technique is used to find which variables are significantly correlated with, e.g. correlation above a certain threshold, or predictive of the variable of interest. For the example dataset in table 1, it may deduce that the variable "interest group" is most strongly correlated with the variable of interest "product purchased". The model builder 103 may also produce a correlation strength metric for the correlation of each of the e.g. independent variables with the variable of interest or selected variable.

113. A list of e.g. independent variables which may be ranked, and optionally corresponding correlation strengths, are then passed to the model interpreter 105.

114. The dataset is read from the data store 101 again. For each e.g. independent variable, the records from the dataset may be split into groups depending on the value of the variable of interest. Statistical summaries may be calculated for each group and significance tests may be performed.

115. The statistical summaries and significance testing results are passed to the template engine 107. Here they may be used to populate or insert data into templates, charts or other data structures and produce insight snippets—e.g. meaningful, human-readable or natural language descriptions of the variable correlations.

116. A ranked list of the insight snippets may then be displayed to the user.

Suitable embodiments of the components of the system shown in FIG. 1 are now described in more detail.

1.2. Data Store

As noted above, according to embodiments of the invention the data store 101 may be any kind of persistent storage implementation. A simple example is a flat file in comma-separated-variable format. It allows the dataset to be read in the form of many records each containing a set of values for a number of variables. An example data structure is described in tables 2 and 3 below. The dataset in this example comprises of a list of customer records. Each record has a customer id and a set of variable values. The format of the values, e.g. Boolean, numeric, and other possible formats, may depend on the type of the variable.

TABLE 2

| Example data structure of data set | |
|---|---|
| field | data type |
| customer records | array of customer records (see table 3) |

TABLE 3

| Example data structure of customer record | |
|---|---|
| field | data type |
| customer id | numeric/string |
| variable values | array (numeric/string/Boolean/date etc) |

1.3. Statistical Model Builder

According to embodiments of the invention, the statistical model builder 103 of FIG. 1 is responsible for reading the dataset from the data store 101 and analyzing it to determine which variables are correlated with the variable of interest and what is the strength of that correlation. These variables may be independent variables. They may be independent of the variable of interest but dependent on other variables. According to embodiments of the invention, the variable of interest is defined by the user of the system. The statistical model builder 103 may then pass a ranked list of variables with correlation strengths to the model interpreter 105. Table 4 shows a typical data structure to store this correlation analysis. Model-specific metrics can also be included depending on the technique chosen for the statistical model builder 103.

TABLE 4

Data structure of the correlation analysis results. The last column is used if the variable of interest is nominal. The last line gives the correlation strength for each nominal variable value. There are many standard techniques which may be used to determine the correlation strengths mentioned above. One example of this is the regression analysis that is described below. Other techniques will be familiar to those skilled in the art.

| field | data type |
|---|---|
| independent variable | string |
| model-specific metric 1 | any |
| model-specific metric 2 | any |
| model-specific metric . . . | any |
| correlation strength | numeric |
| nominal category correlation strengths | dictionary (string:numeric) |

1.3.1. Example Regression Analysis

Figure 2:
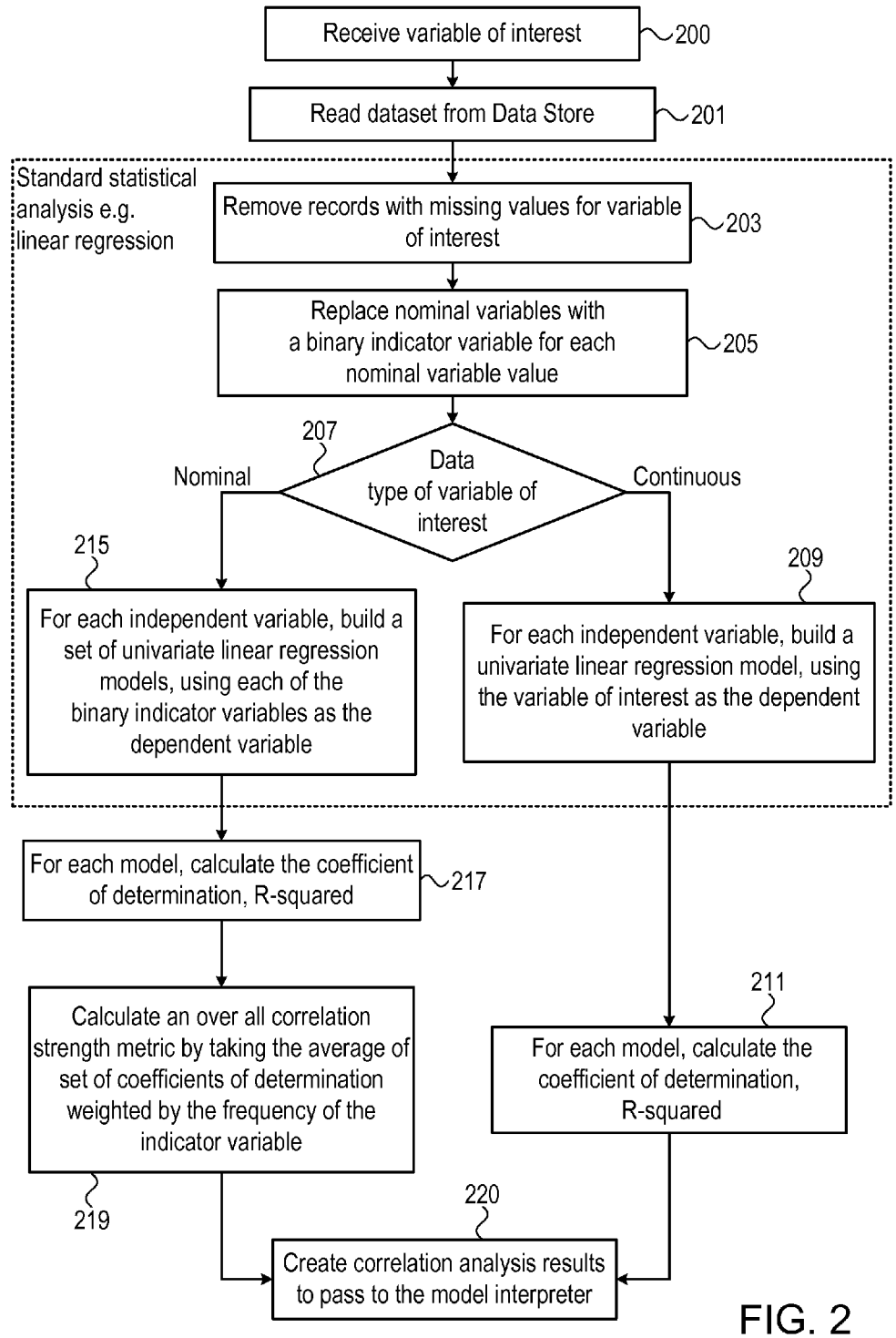
FIG. 2 is a flowchart showing the operation of a statistical model builder according to some embodiments of the invention.

A diagram illustrating a possible data flow for a simple regression analysis according to some embodiments of the invention is presented in FIG. 2. According to embodiments of the invention this flow may take place in the statistical model builder 103. The operations in the flow of FIG. 2 need not necessarily take place in the order illustrated or described below. The flow of FIG. 2 commences with operations 200 and 201 at which a variable of interest is received and a dataset is read from the data store 103. The dataset read at operation 201 may be a subset of a larger dataset held at the data store 101. For example the dataset may comprise a set of records selected according to certain criteria.

Then at operation 203 the dataset is preprocessed to remove records with missing values of the variable of interest. Then at operation 205, nominal variables are replaced by a set of indicator variables, e.g. binary indicator variables, for each nominal variable value. Operation 205 may be performed on all variables, for example the variable received at operation 200 as well as the independent variables. Depending on the capacity of the system in which the flow is carried out, this replacement can be limited to a set of the most frequently observed variable values, for example to reduce memory and CPU usage. As a result only the records containing the most popular variables will be used in the remainder of the flow. Alternatively rather than ignoring records containing less frequently observed variable values, a single indicator variable can be created to represent all variable values other than the set of most frequently observed.

A set of univariate linear regression models are then trained in order to find correlation strengths. According to embodiments of the invention, the manner in which the models are trained depends on the nature of the variable of interest, for example whether it is a nominal or continuous variable. Therefore, in the example flow of FIG. 2, at operation 207 it is determined whether or not the variable received at operation 200 is continuous or nominal.

Continuous Variable of Interest:

If the variable of interest is continuous, it can be used directly as the dependent variable, and one model can be trained for each independent variable in the system, or set of records in the dataset, against this dependent variable. This takes place at operation 209 in the example flow of FIG. 2. The model building at operation 209 may be carried out for only a subset of the independent variables in the system or records in the dataset rather than all of them.

Suppose for example that the variable of interest is total spend. Operation 209 may result in a model for each dependent variable or a subset of the dependent variables. The dependent variables may be nominal or continuous. For nominal variables there may be a model for each indicator value. Thus operation 209 may generate a model for:

Spend versus age
Spend versus Is City London=1
Spend versus Is City Paris=1
and other pairs of variables.

For each independent variable, in other words each model, at operation 211 the coefficient of determination, R-squared, is calculated. This is a standard measure used in statistical techniques of how well a model fits observed data.

Nominal Variable of Interest:

In the case of a nominal variable of interest, the flow proceeds to operation 215 where a univariate linear regression model is trained, or built, for each combination of independent variable and indicator variable. The model building at operation 215 may be carried out for only a subset of the independent variables in the system or records in the dataset rather than all of them.

Suppose for example that the variable of interest is product purchased. Operation 215 may result in a model for each dependent variable or a subset of the dependent variables. The dependent variables may be nominal or continuous. Thus the model building operation at operation 215 may generate a model for:

Product purchased=mortgage versus age
Product purchased=credit card versus age
Product purchased=mortgage versus Is City Paris=1
and other pairs of variables.

For each independent variable, in other words each model, at operation 217 the coefficient of determination, R-squared, is calculated in a similar manner to the calculation in operation 211. Then at operation 219 an overall correlation strength metric can be determined by, for example, the mean correlation strength across the indicator variables, optionally weighted by the frequency e.g. relative frequency of the indicator. The aim of this operation is to determine an overall correlation metric, e.g. R-squared for each independent variable or binary indicator variable against the variable of interest.

At operation 220, based on either the coefficients calculated at operation 211 or the correlation strength metrics calculated at operation 219, correlation analysis results are created which are passed to the model interpreter 105. Thus according to embodiments of the invention, for each of a set of independent variables a correlation metric is calculated or determined. In the embodiment shown in FIG. 2, for nominal variables, a correlation metric is calculated by taking the weighted mean of the R-squared values for each model, and for continuous variables the correlation metric is simply the R-squared value for the single model.

Building univariate models for each independent variable allows any co-linearity between the independent variables to be disregarded; however it also means that any interaction effects are disregarded. Table 5 shows a data structure which could be used for the results of the regression correlation analysis.

TABLE 5

Data structure of correlation analysis results

| field | data type |
|---|---|
| independent variable | string |
| regression weight | numeric |
| regression intercept | numeric |
| correlation strength | numeric |
| nominal category correlation strength | dictionary (string:numeric) |

1.4. Model Interpreter

According to embodiments of the invention, the model interpreter 105 consumes or receives as input the correlation analysis results of the statistical model builder 103 and uses them together with the original dataset to produce summaries which describe the most significant features found by the statistical model builder 103. An example of this process is described in the following sections for both nominal and continuous variables of interest, with reference to FIG. 3.

Figure 3A:
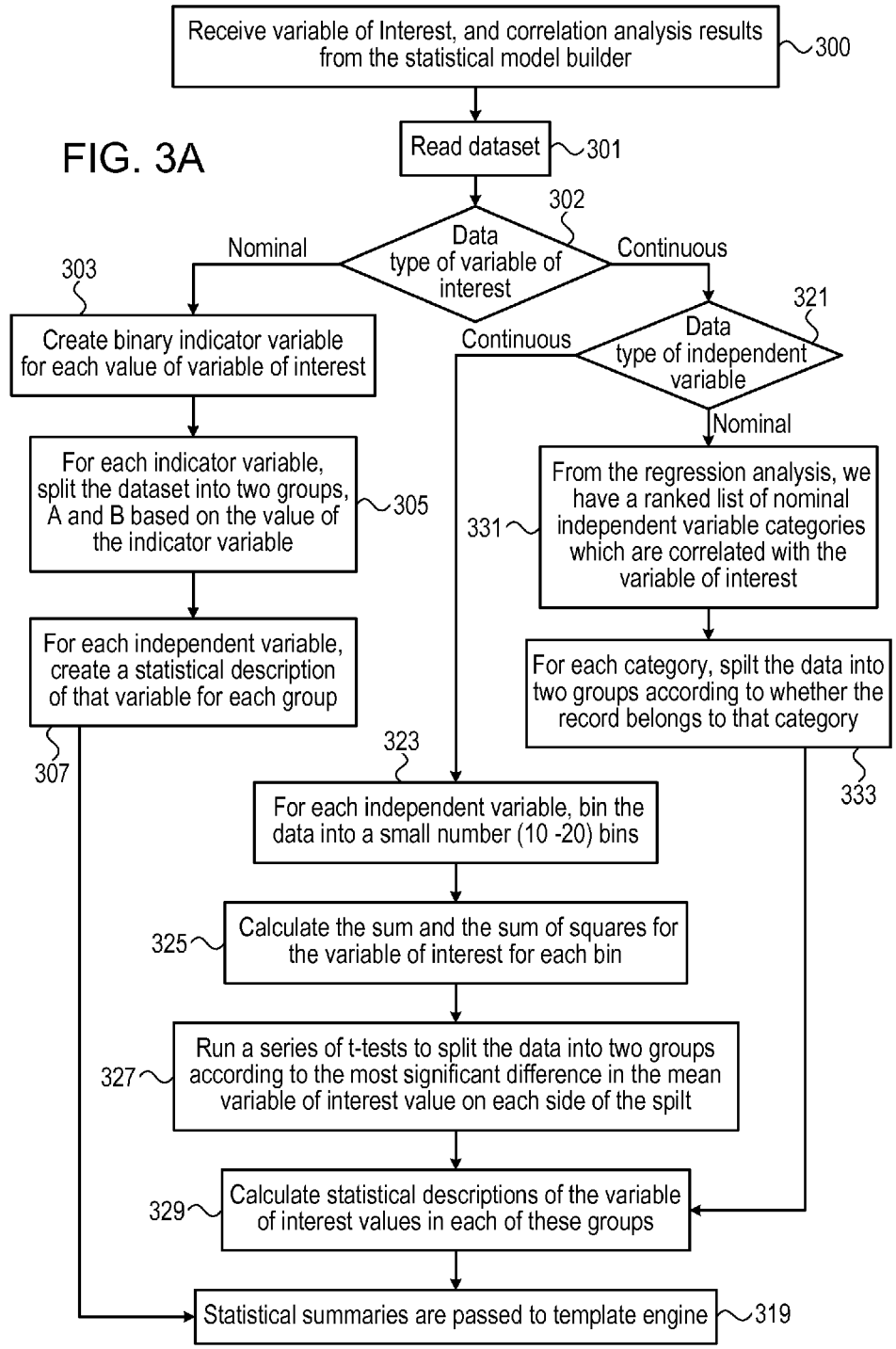
FIG. 3A is a flowchart showing the operation of a model interpreter according to some embodiments of the invention.

The flow of FIG. 3A commences at operation 300 with the variable of interest being received at the model interpreter 105 and the correlation analysis results. These may be passed on to the model interpreter 105 from the statistical model builder 103, for example along with the correlation analysis results relating to that variable, which may have been obtained according to a process as shown in FIG. 2.

The flow of FIG. 3A also includes the reading of the dataset at operation 301. Next, as with the flow of FIG. 2, the type of the variable of interest is determined, in this example whether it is continuous or nominal, at operation 302.

Nominal Variable of Interest:

For nominal variables of interest, a summary is calculated to describe the correlations between each independent variable and each nominal value of the variable of interest.

In order to calculate the summary for a single independent variable and a single value of the variable of interest, the dataset is read, for example as noted above at operation 301, and a binary indicator variable created based on each single value of the variable of interest at operation 303, in a similar manner to operation 205. It will be appreciated that this operation need not be repeated; instead the indicators used in operation 205 may be used. The dataset is then split into two groups depending on the value of the indicator variable, as indicated at operation 305 where the data set is split into two groups, A and B. Thus, for example, if the variable of interest is Product Purchased and a possible value is Mortgages, group A may include records for which the Product Purchased variable is Mortgages and group B may include records for which the Product Purchased variable is not Mortgages. There will be a similar pair of groups for all other possible values of the variable Product Purchased.

At operation 307, a statistical summary is created for each group to describe the distributions of the independent variable values for each group. This can include metrics such as the mean, variance, median, number of records, histogram of nominal values, frequency of missing values, first and third quartile values etc. The nature of the statistical summary may depend on whether the independent variable is nominal or continuous. The statistical summary may be derived from the results of statistical analysis or correlation analysis, such as that performed in the flow of FIG. 2. The creation of the statistical summaries, also called statistical descriptions, may be achieved for example through a subsidiary flow as shown by way of example in FIG. 3B.

Figure 3B:
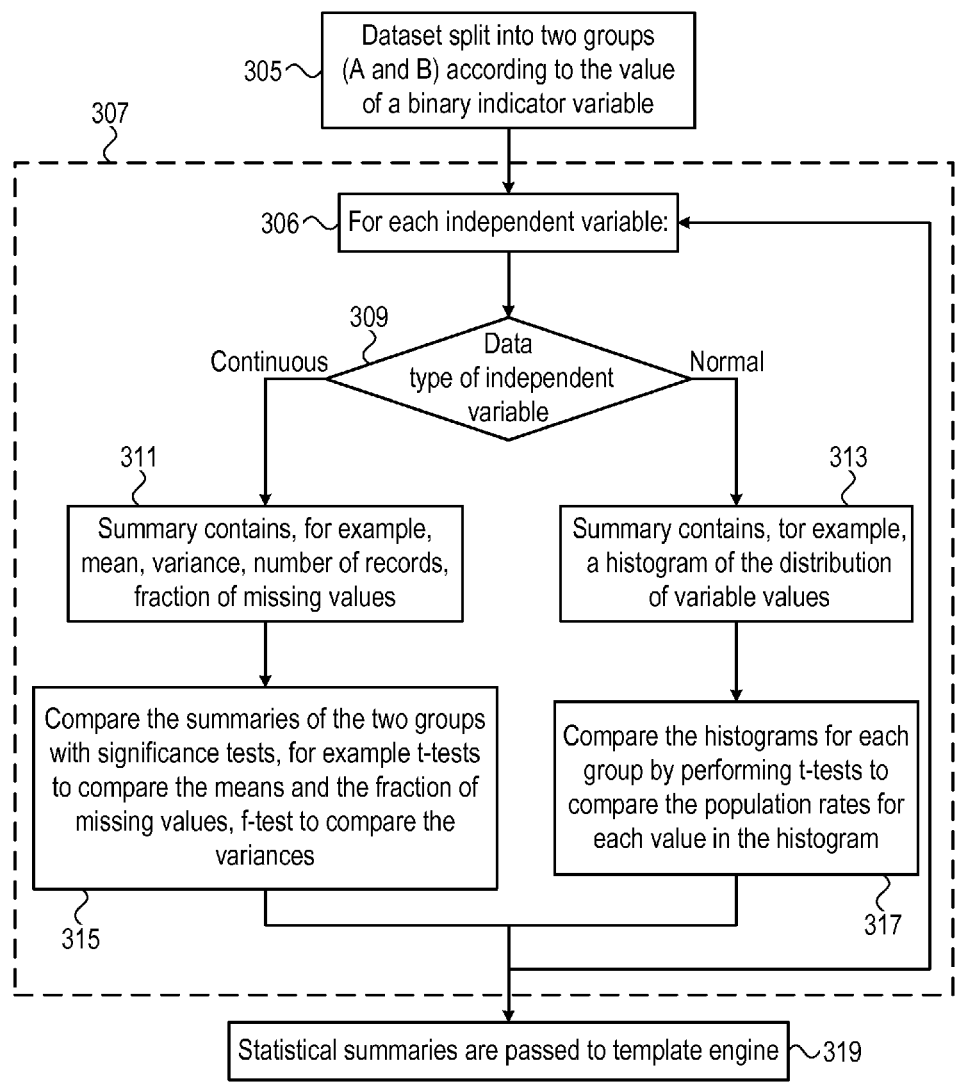
FIG. 3B is a flowchart showing a possible process for the creation of statistical summaries shown in FIG. 3A, according to some embodiments of the invention.

In the flow of FIG. 3B, statistical descriptions or summaries for each group are compared to find significant differences. According to embodiments of the invention this is performed for each independent variable as indicated by operation 306. For this purpose, according to some embodiments of the invention, continuous and nominal independent variables may be treated differently. Therefore in the flow of FIG. 3B it is determined at operation 309 whether the independent variable is nominal or continuous. It will be appreciated that this determination may take place earlier in the flow. In the following age and city are used as possible examples of continuous and nominal variables respectively.

Since the nature of the summaries obtained for the variables may differ depending on whether the independent variable under consideration is nominal or continuous, in the flow of FIG. 3 the summaries are created at operations 311 for continuous variables and 313 for nominal variables.

In the case of continuous variables, examples of statistical summaries that may be created at operation 311 include but are not limited to the mean of the continuous variable, the variance of the continuous variable, the total number of records in the group and the fraction or proportion of records that are missing values for the variable and cannot therefore be allocated to one group or another.

Thus the output of operation 311 may be for example the mean and variance of age, the number of records from which the mean and the variance were determined, and the number of records where age data is not available, for example because a party decided not to disclose this. A specific example of a possible output is the mean age of persons who bought a mortgage.

At operation 315, summaries created in operation 311 for pairs of groups are compared with each other to determine their significance. For example the average age of persons who bought mortgages may be compared to the average age of those who did not buy mortgages to determine the significance if any of any differences between the two mean values.

For example for a continuous independent variable it is possible to test for differences between the following statistics:

means can be compared using a standard t-test which measures the statistical confidence that the mean of one group is really different from the mean of the other group. For example this can be based on a particular variable. Thus if the variable is age, this comparison may, to give another example, compare the mean age for those records for which City=Paris with the mean age for those records for which City≠Paris.

frequency of missing values can be compared using a t-test, also known as a Student's t-test, a well-known statistical test.

variances can be compared using an F-test, which is also a known statistical test.

As noted above, these comparisons and test are generally indicated at operation 315.

For nominal independent variables, a summary prepared at operation 313 may be in the form of a histogram indicating the distribution or frequencies of each value, for example number of records for which city=London, no. of records for which city=Paris, etc. Then at operation 317, values from the distribution histograms for each group may be compared, e.g. a comparison of the number of records for which a mortgage was purchased and the city is London and the number of records for which a mortgage was purchased and the city is not London. As with continuous variables, t-tests may be used to determine values that appear significantly more or less frequently. A typical data structure of these statistical summaries is given in tables 6 and 7 below.

TABLE 6

Example data structure of how statistical summaries are represented.

| field | data type |
| --- | --- |
| independent variable | string |
| nominal variable of interest value | string |
| statistical summary | abstract (see table 7) |

TABLE 7

Example data structures statistical summaries and significant test results.

| | field | data type |
| --- | --- | --- |
| Group A | mean | numeric |
| | variance | numeric |
| | records | numeric |
| | missing values | numeric |
| | nominal histogram | dictionary (string:numeric) |
| Group B | mean | numeric |
| | variance | numeric |
| | records | numeric |
| | missing values | numeric |
| | nominal histogram | dictionary (string:numeric) |

TABLE 7-continued

Example data structures statistical summaries and significant test results.

| | field | data type |
|---|---|---|
| A/B comparison | difference between means | numeric |
| | p-value of difference between means | numeric |
| | difference between population rates | numeric |
| | p-value of difference between population rates | numeric |
| | difference between variances | numeric |
| | p-value of difference between variances | numeric |
| | difference between nominal value frequencies | dictionary (string:numeric) |
| | p-value of difference between nominal value frequencies | dictionary (string:numeric) |

At operation 319 in FIG. 3B, also shown in FIG. 3A, these statistical summaries, optionally with indications of their statistical significance, or possibly only those that are statistically significant, are passed to the template engine 107.

Continuous Variable of Interest:

Referring back to FIG. 3A, for continuous variables of interest, according to embodiments of the invention, it is also the case that the independent variables on which the variable of interest may depend may be treated differently according to whether they are continuous or nominal.

For example, the insight snippet may include some specific values to illustrate different values of the variable of interest for specific values, or ranges of values of continuous independent variables. For example, "customers with age greater than 35 (dependent variable of interest), have 45% higher total spend (continuous independent variable)".

In order to find appropriate ranges to create snippets like this, in the example flow of FIG. 3A, it is first determined at operation 321 whether the independent variable, on which the variable of interest depends, is continuous or nominal.

Continuous Independent Variable:

At operation 323 each continuous independent variable is binned to form a number of categories, in this example around 10 to 20 categories. The number of categories may be set depending on the possible range of values of the independent variable, e.g. age, possibly amongst other factors. According to embodiments of the invention a binning algorithm may be used for this purpose. This may be one that uses rounded numbers for the category boundaries. According to embodiments of the invention these bin boundaries may appear in the final snippet.

At operation 325 the sum, and sum of squares may be calculated for the variable of interest for each of the bins. Recall that total spend was chosen as an example of a continuous variable of interest and age was chosen as a continuous independent variable. A possible output of operation 325 is the sum of the total spend figures for each age range and the sum of squares for the total spend figures for each age range.

Next at operation 327 the data may be split into groups, two groups according to the embodiment illustrated in FIG. 3 although any number of groups may be used depending on the particular embodiment. According to embodiments of the invention, the data may be split into groups such that the difference in the variable of interest for each group is most significant. This may be done for example using a tree splitting algorithm, or a series of t-tests as indicated for example at operation 327 in FIG. 3.

At operation 329, statistical descriptions are calculated of the variable of interest values for each of the groups resulting from the splitting at operation 327. Suppose that the split occurred at age 50. An example of a statistical description might be that those aged over 50 spend significantly more than those under 50.

Operations 321 to 329 may be performed for each independent variable on which it is deemed the variable of interest may depend. This may be a subset of the variables to which the data records relate. The results of these operations may reveal that the variable of interest is independent of one or more independent variables on which it was thought to depend.

Nominal Independent Variable:

If it is determined at operation 321 that the independent variable is nominal, the flow of FIG. 3 continues to operation 331 where the results of regression analysis, for example obtained using the process of FIG. 2, may be used. The output of operation 219 in FIG. 2 may be used to provide a ranked list of nominal independent variable categories that are correlated with the variable of interest. These are taken at operation 331 and at operation 333, for each category, the data is split into two groups according to whether or not a record belongs in that category. This is similar to operation 305 for nominal variables of interest. Thus for example records may be allocated to group A if the city is London and group B if the city is not London. These groups are used to calculate statistical descriptions of the variable of interest values in each of these groups. This may involve comparisons similar to operation 315 and the use of significance testing similar to operation 327 for continuous variables.

1.5. Template Engine

According to embodiments of the invention, the template engine 107 stores a set of templates, charts or other data structures which, when populated or filled in (e.g. have data added), produce human-readable snippets based on the statistical summaries produced by the model interpreter 105. For this purpose the model builder may store a set of rules to determine which template or templates to use for each variable. A standard set of templates and rules may be provided, but these may be configured to be altered or supplemented, for example according to a user's preferences.

Figure 4:
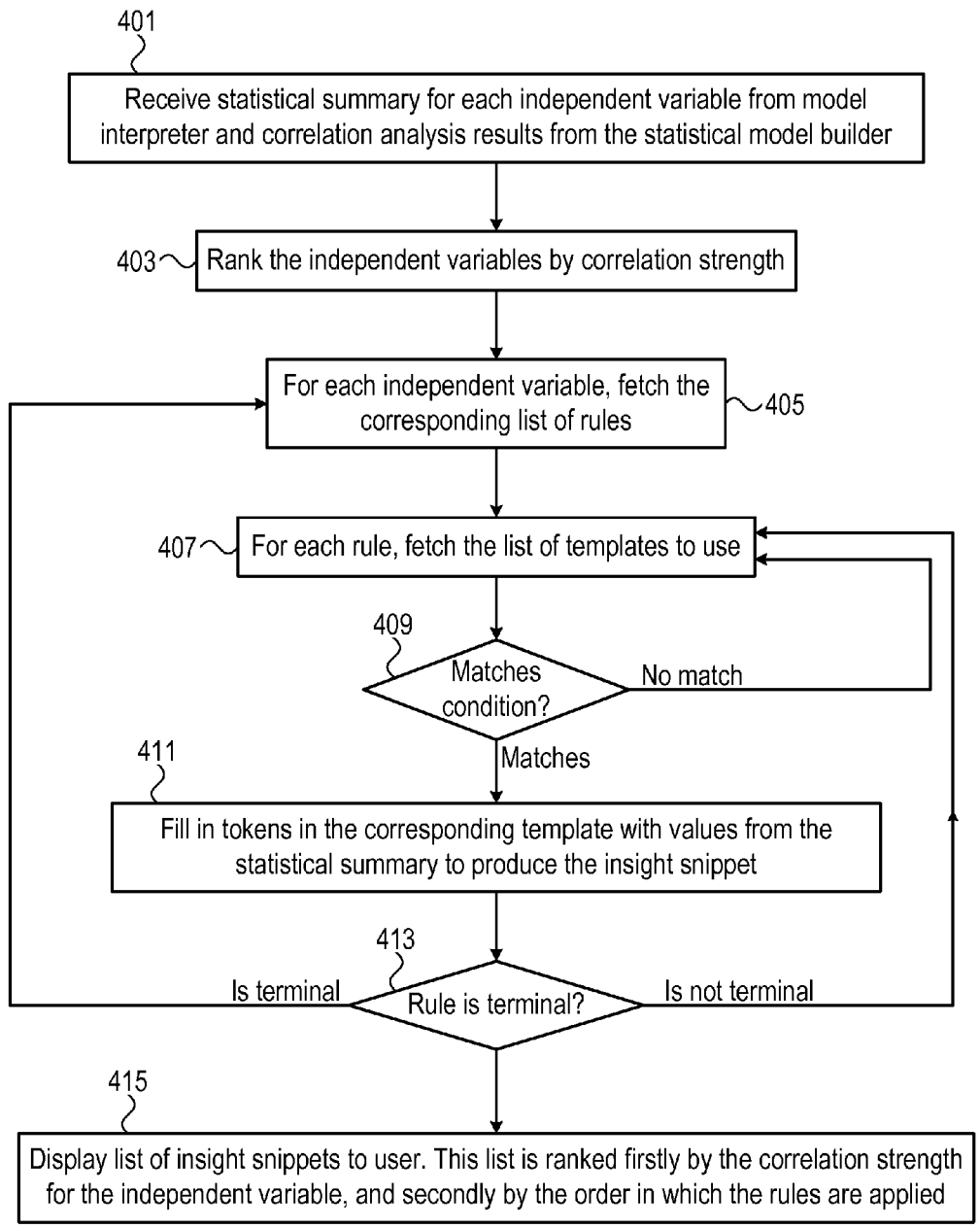
FIG. 4 is a flowchart showing the operation of a template engine according to some embodiments of the invention.

FIG. 4 shows an example of a decision diagram illustrating a process which may be used in the generation of insight snippets according to embodiments of the invention.

An example rule and matching template would be: "If independent variable is continuous and the mean of group A is greater than the mean of group B, then create snippet using template X." An example template X in this case would be: "Customers with ${variable of interest} of ${variable of interest value}, tend to have higher values of ${independent variable}". In this example the variable of interest is included in the template but not in the rule. Therefore this rule could be used for all continuous independent variables. While specific grammars and forms are provided for rule, templates and charts herein, other forms may be used.

More generally, each rule may specify at least one variable, for example at least one independent variable, or type of variable, for example nominal or continuous. A template corresponding to a rule may state the name of the independent variable and optionally one or more values for the independent variable. There may be more than one rule specifying each variable. According to embodiments of the invention there may be a one to one correspondence between templates and rules. Alternatively according to the embodiments illustrated in FIG. 4, at least some rules may correspond to multiple templates.

Each rule may comprise a condition e.g. "If the independent variable is age and the mean of group A is greater than the mean of group B" and an action: "then create snippet using template X".

Referring again to the example rule and template above, if the rule is matched, the tokens (phrases surrounded by ${ } in the template) in template X will be replaced with values from the statistical summary to produce the meaningful snippet: "Customers with last product purchased of loan tend to have higher values of interaction counts."

More generally, according to embodiments of the invention, if conditions specified in a rule are met by the dataset, one or more tokens or place-holders provided in the template may be populated or filled with one or more of names of variables and values of variables. Values of variables used to populate a template may be derived from the statistical analysis of the data in the dataset.

According to embodiments of the invention, additional templates, for example which are more specific to the independent variable and variable of interest, may be provided. These may further improve the readability, for example, "If variable of interest is "product purchased" and independent variable is "interaction counts" then use template Y" where template Y would be "Customers who last purchased a ${variable of interest value} tend to have more previous interactions". These additions may be based on knowledge of how the variable is created in the first place, for example, knowledge that the interaction count is calculated as the count of all interaction events between a business and a customer. This knowledge can be used to phrase the language of the template.

According to embodiments of the invention, each rule is applied to each independent variable to determine whether the conditions of the rule are met by the dataset. From this determination the appropriate templates are chosen and populated or filled for presentation to a user, optionally with an indication of confidence, e.g. the statistical confidence for the result in the statistical summary which is being presented in insight snippet. This procedure is illustrated in the flow of FIG. 4. The procedure of FIG. 4 may be implemented in the template engine 107.

An example set of rules and corresponding templates for age (variable of interest) is presented below. This will be referred to in the following description of FIG. 4.
Rules:
"If the independent variable is age and the mean of group A is greater than the mean of group B then create snippet using template A"
"If the independent variable is age and the mean of group A is less than the mean of group B then create snippet using template B"
"If the independent variable is age and the standard deviation of group A is less than the standard deviation of group B then create snippet using template C"
"If the independent variable is age and the standard deviation of group A is greater than the standard deviation of group B then create snippet using template D"
"If the independent variable is age and the missing value rate of group A is greater than the missing value rate of group B then create snippet using template E"
"If the independent variable is age and the missing value rate of group A is less than the missing value rate of group B then create snippet using template F"
Templates:
A: "The average age of customers who purchased ${variable of interest value} is ${independent variable: difference between means} years older than other customers"
B: "The average age of customers who purchased ${variable of interest value} is ${independent variable: difference between means} years younger than other customers"
C: "Customers who purchased ${variable of interest value} have a narrower distribution of ages than other customers (mean: ${independent variable: mean}, standard deviation: ${independent variable: standard deviation)}"
C: "Customers who purchased ${variable of interest value} have a wider distribution of ages than other customers (mean: ${independent variable: mean}, standard deviation: ${independent variable: standard deviation)}"
E: "Customers who purchased ${variable of interest value} are more likely to provide information about their age"
F: "Customers who purchased ${ variable of interest value} are less likely to provide information about their age"

Referring to FIG. 4, at operation 401, according to embodiments of the invention, the template engine 107 receives a statistical summary for each independent variable from the model interpreter 105 and correlation analysis results from the statistical model builder 103. At operation 403, the independent variables are optionally ranked by correlation strength metric. In the example of FIG. 2 the metric used is R-squared. Other possible metrics will be known to those skilled in the art. Next at operation 405, for an independent variable, e.g. the next in the ranking determined at operation 403, a corresponding rule or list of rules is fetched. The example above is a list of rules for independent variable age. The list of rules for "age" may include rules that are applicable to any continuous variable. These rules may be stored in the data store 101 in which case they may be supplied directly to the template engine or via the model interpreter. Alternatively the rules may be stored elsewhere. As the following explanation will show, operation 405 represents an instance of an operation applied to a single variable that is part of a loop whereby operation 405 is eventually applied to each independent variable.

For each variable each rule is applied in turn. This is done in order to determine which template or templates are applicable. The application of the rule is done by evaluating the condition of the rule based on the statistical summaries of that variable. For example, for the variable age, the first rule in the example set above is:

"If the independent variable is age and the mean of group A is greater than the mean of group B then create snippet using template A".

At least one template may be provided for each rule. At operation 407 a template or a list of templates is fetched for one rule. Operation 407 represents an instance of an operation applied to a single rule that is part of a loop whereby operation 407 is eventually repeated for each rule and each template.

Thus, at operation 409 it is determined whether one or more conditions specified by the rule used in the previous instance of operation 407 are met by the dataset. In other words, it is determined whether there is a match between the condition or conditions in the rule and the data in the dataset. This may be done using the statistical summaries and descriptions obtained as described above.

In the event of a match, e.g. the condition(s) of the rule are met, the flow continues to operation 411. Here, the place-holders or tokens provided in the template for the rule, or each template in the list of templates for the rule, are then filled in or populated, for example using one or more of the statistical summaries and descriptions described above. The result may be an insight snippet as described above.

Referring again to the example set of rules and templates, if the mean age of group A in the statistical summary is indeed greater than the mean age of group B, then the condition will evaluate to true (i.e. be matched) and template A will be applied. Template A is:

A: "The average age of customers who purchased ${variable of interest value} is ${independent variable: difference between means} years older than other customers".

Thus for those rules that are obeyed by the data, the corresponding template or templates may be selected and populated. The result may be a sentence in natural language.

If there is no match at operation 409, the flows reverts to operation 407 where the template or list of templates for the next rule is fetched and operation 409 is repeated for the next rule, e.g.

"If the independent variable is age and the mean of group A is less than the mean of group B then create snippet using template B".

Each rule may be pre-configured as either being terminal or non-terminal Thus after operation 411, if the rules have been configured in this way, it is determined at operation 413 whether the rule that was obeyed is terminal. A rule may be configured to be terminal if for any reason there is no need for the flow to continue if that rule is obeyed.

If a rule is non-terminal, the template(s) for the next rule are obtained at operation 407 and then operations 409 to 413 are repeated. The loop of operations 407 to 413 is repeated until either all of the rules have been applied or a terminal rule is reached. In this way more matches may be found and more snippets may be added to the results.

If a rule is found to be terminal at operation 413, the execution of rules for that variable stops and the next variable is obtained at operation 405. The process comprising operations 407 through 413 is then repeated for each variable.

An example of a suitable data structure for the rules is given in tables 8, 9 and 10 below.

TABLE 8

Example data structure of template engine rules

| field | data type |
|---|---|
| condition | abstract (see table 9) |
| template | abstract (see table 10) |
| is terminal | boolean |

TABLE 9

Example data structure of conditions

| field | data type |
|---|---|
| variable of interest | string |
| variable of interest data type | string |
| variable of interest value | string/numeric |
| all fields from statistical summaries | see table 7 |

TABLE 10

Example data structure of templates

| field | data type |
|---|---|
| template | string with replacements tokens |

The result of operations 401 to 411 is a set or list of snippets, optionally ordered by the strength of the correlation and the logic contained in the template engine 107. This list of results is returned to the user at operation 415. The insight snippet or snippets may be presented to a user, for example using a visual display of any kind known in the art. Alternatively the resulting sentence may be presented to the user audibly or in any other manner. According to some embodiments, the snippets are presented to a user in the form of a list. These may be ranked, for example firstly by correlation strength for the independent variable and secondly by the order in which the rules are applied.

It will be appreciated that according to embodiments of the invention each insight snippet may describe a relationship between the variable of interest, or a value or range of values of the variable of interest, and the variable to which the statistical description applies.

The translation of analysis of the data records into insight snippets has many potential advantages. For example it can enable a human user of the data to make decisions relating to it more quickly than if the analysis is simply presented in mathematical form. This is particularly helpful to users dealing with telephone inquiries for example. The information may be presented in a form that is more easily assimilated and readily understood and can save the user from having to perform additional operations on the data in order to be able to make sense of it.

According to embodiments of the invention, lists of insight snippets for different variables may be presented on separate screens.

Figure 5:
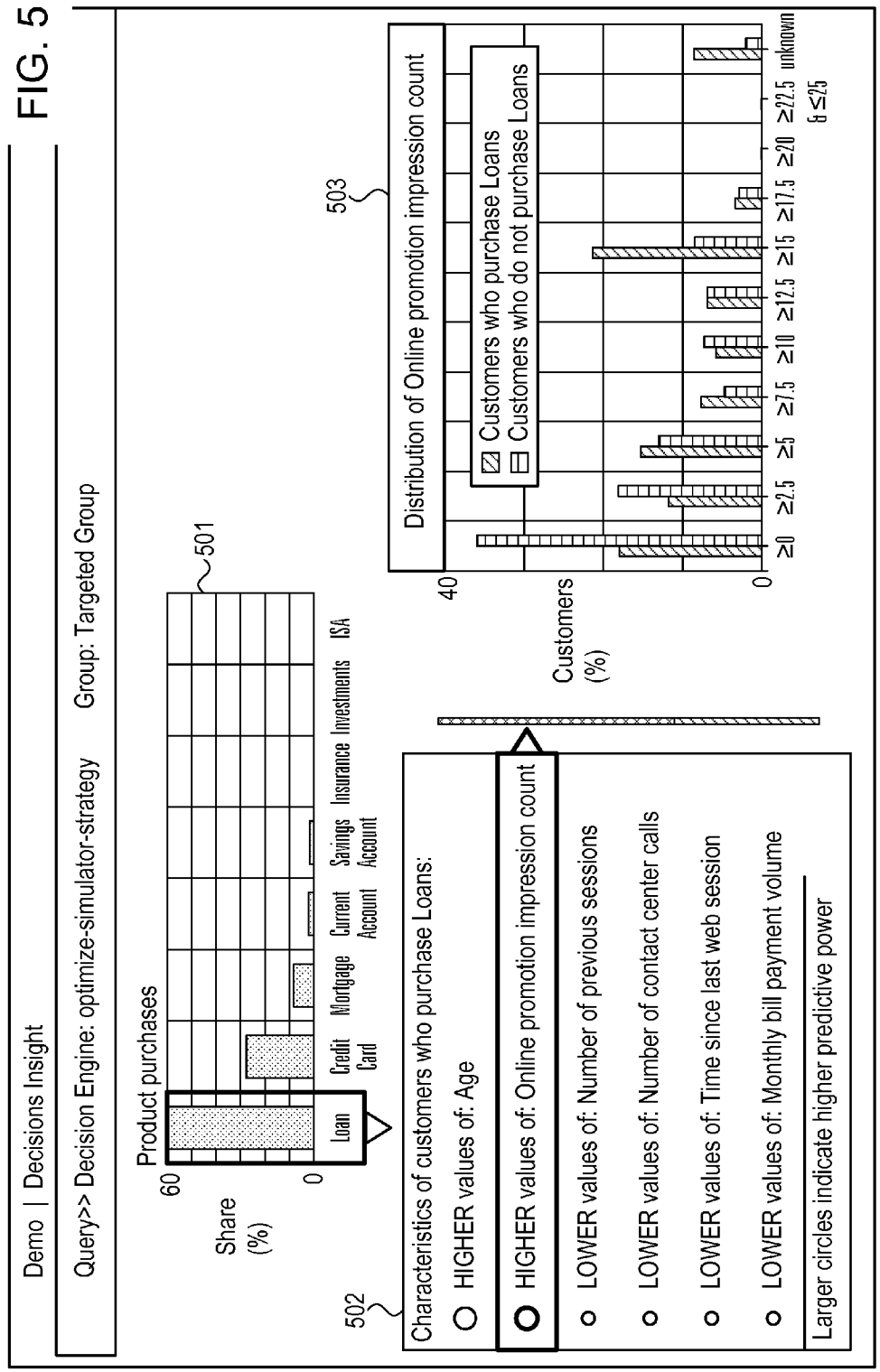
FIG. 5 is an example screenshot that may be presented to a user according to some embodiments of the invention.
Figure 6:
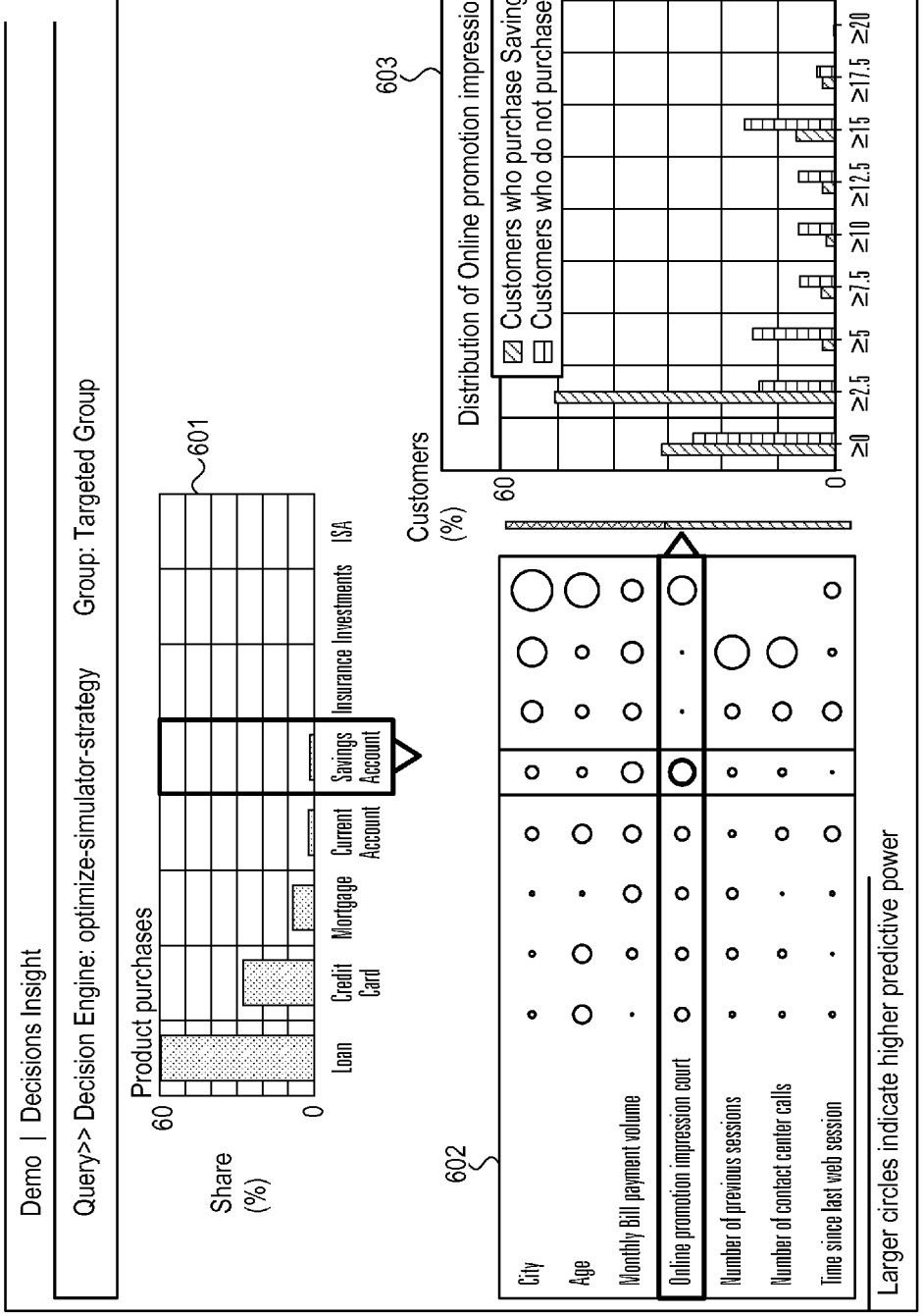
FIG. 6 is an example screenshot that may be presented to a user according to some embodiments of the invention.

Some screenshots showing results which may be obtained from embodiments of this invention are given in FIGS. 5 and 6.

Referring to FIG. 5, in the bar chart 501 at the top of screen, the distribution of values of a variable of interest is displayed. In this example the variable of interest is product purchased of which in this example there are 8 possible options: loan, credit card, mortgage, current account, savings account, insurance, investments and individual savings account (ISA). The method described above was used in one example to analyze why a machine learning decisioning system made certain decisions.

When the user clicks on one of the bars in the bar chart 501, "loan" in the illustrated example, an ordered list of insight snippets 502 appears below. For example, from the top snippet being displayed it can be deduced that customers who purchase loans tend to be older. In the example display of FIG. 5, larger circles are used to indicate those insight snippets that have higher predictive power. It will be appreciated from the above that the insight snippets can be more precise, and may for example indicate that customers under 50 are more likely to purchase mortgages than those under 50.

The user can click on (e.g. use a mouse or other input device to select) an individual insight to see the underlying variable distributions 503 shown in this example on the right; this provides a detailed view of the raw data which justifies the snippet. In the illustrated example the second snippet has been selected which relates purchase of loans to online promotion impression count, e.g. the number of times the customer has viewed particular online promotional material.

FIG. 6 shows an alternative view. The bar chart 601 and detailed view of raw data 603 are similar to those shown at 501 and 503 in FIG. 5. However instead of a list of sentences a table of circles 602 is displayed. In this example larger circles represent variables which are more strongly predictive of a particular category of the variable of interest. This allows users to quickly see variables which are the strongest? predictors of the variable of interest. In the example of FIG. 6, "savings account" has been selected as the product purchased.

Figure 7:
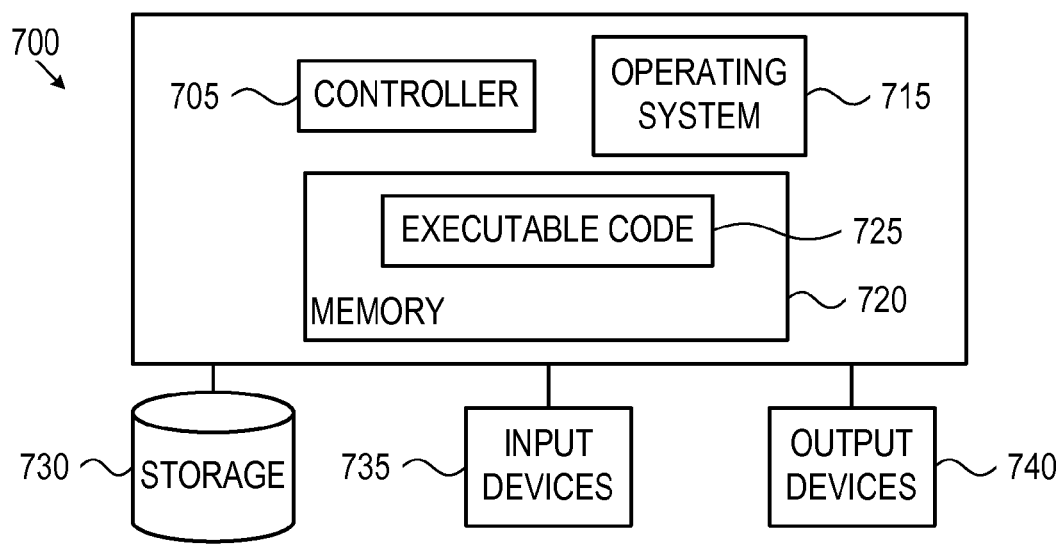
FIG. 7 is a high level block diagram of an exemplary computing device according to embodiments of the present invention.

Reference is now made to FIG. 7 which shows high level block diagram of an exemplary computing device according to embodiments of the present invention:

Computing device 700 may be configured, for example using suitable programming, to implement the functions of the components illustrated in FIG. 1 or other systems which may carry out embodiments of the present invention.

Computing device 700 may include a controller 705 that may be or include, for example, one or more computer central processing unit processors (CPU), chips or any suitable computing or computational devices, an operating system 715, one or more memories 720, a storage 730, an input devices 735 and an output devices 740.

Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units. Memory 720 may include the data store 101 of FIG. 1, Executable code 725 may be any executable code, e.g., an application, a program, a process, task or script. Executable code 725 may be executed by controller 705 possibly under control of operating system 715. For example, executable code 725 may be an application or unit. Processor or controller 705 may be configured to carry out methods according to embodiments of the invention by for example being connected to a memory 720 containing software or code which when executed cause the controller 705 to carry out such methods. For example, the various modules shown in the example of FIG. 1 (e.g., data store 101, model builder 103, model interpreter 105, template engine 107 and other modules) may be implemented by processor processor or controller 705 executing software. In other embodiments functionality need not be divided among the specific modules described in FIG. 1. Storage 730 may be or may include, for example, one or more hard disk drives, floppy disk drives, Compact Disk (CD) drives, universal serial bus (USB) devices or other suitable removable and/or fixed storage units.

In some embodiments, some of the components shown in the figure above may be omitted. For example, memory 720 may be a non-volatile memory having the storage capacity of storage 730. Accordingly, although shown as a separate component, storage 730 may be embedded or included in memory 720.

Input devices 735 may be or may include a mouse, a keyboard, a touch screen or pad or any suitable input device. It will be recognized that any suitable number of input devices may be operatively connected to computing device 700 as shown by block 735. For example, input devices 735 may be any device operatively connected to a user control where the user control is a code segment similar to executable code 725. Any of the input devices may enable a human user to communicate with the device 700, for example to input a selection or indication of a variable of interest.

Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, a printer, a universal serial bus (USB) device or external hard drive may be included in input devices 735 and/or output devices 740.

Embodiments of the invention may have numerous applications and uses depending on the nature of the data records. The foregoing examples relate to banking or financial data. Another specific example of a possible use of embodiments of the invention is in evaluation of customer service, for example in call centers. Embodiments of the invention may be used to provide ways for business users to understand what drives specific call types to a call center or contact center. This may be done by comparing different customer segments and providing a comparison view of relevant variables in a way that will make it easier for a business user to understand which of a number of variables has the strongest predictive power.

Suppose it is possible to compare between customer segments according to which option they have chosen where the starting point is a decision engine. The techniques described above might be used to analyze why the decision engine made its decision. For example: compare all related options in optimize-simulator-strategy decision engine.

This capability can be extended with the ability to choose event attributes and/or variables group to be compared. For example: compare all related customers in Billing-contact-reason group. In case that service-contact-reason group would be populated by 3 different contact reason attributes such as Billing-inquire, Technical-issue and value added services (VAS)-inquiry, embodiments of the invention may enable the comparison of sample data for customers that have one of these attributes, or variables, as their contact reason. This way a business user can understand which variables have the highest predictive power per each contact reason relative to the other contact reasons.

The user can create deep insights for multiple attribute groups (each attribute being a variable) and through the automation of the analysis of the dataset can expect a quicker response time.

A nightly sampling process may be used to perform the calculations and cache them for use during the day.

Figure 8:
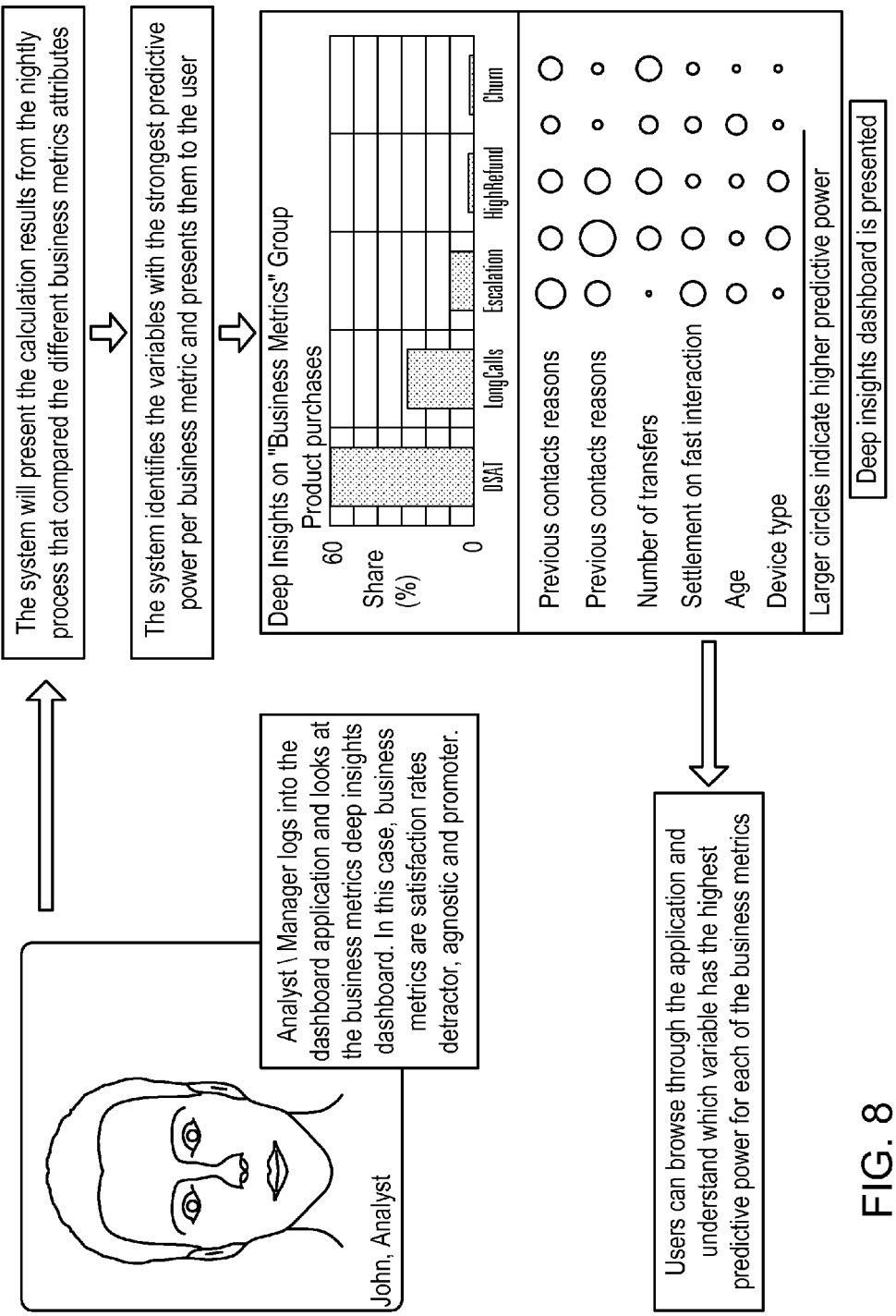
FIG. 8 is a high level flow chart showing the operation of a practical implementation of a method according to some embodiments of the present invention.

FIG. 8 shows an example work flow according to an embodiment of the invention termed "deep insights". The flow commences with an analyst/manager logging into a graphical user interface provided for example through a dashboard application. The user looks at a business metrics deep insights dashboard. These business metrics or variables may be for example satisfaction rates. Values of satisfaction rate may be detractor (e.g. for a customer who gives negative feedback), agnostic (e.g. for a customer who gives neither negative nor positive feedback) and promoter (e.g. for a customer who gives positive feedback). A system according to the invention may present the calculation results from a nightly process that compared the different business metrics and attributes. The variables with the strongest predictive power may then be identified and presented to the user, for example in the form of a series of natural language statements which may be ranked. The user may then browse through the dashboard application in a similar manner to that described in connection with FIGS. 5 and 6 to understand which of the variables has the highest predictive power for each of the business metrics.

Predictive power in this context can be regarded for example as same as correlation although in general it is not necessarily the same.

Figure 9:
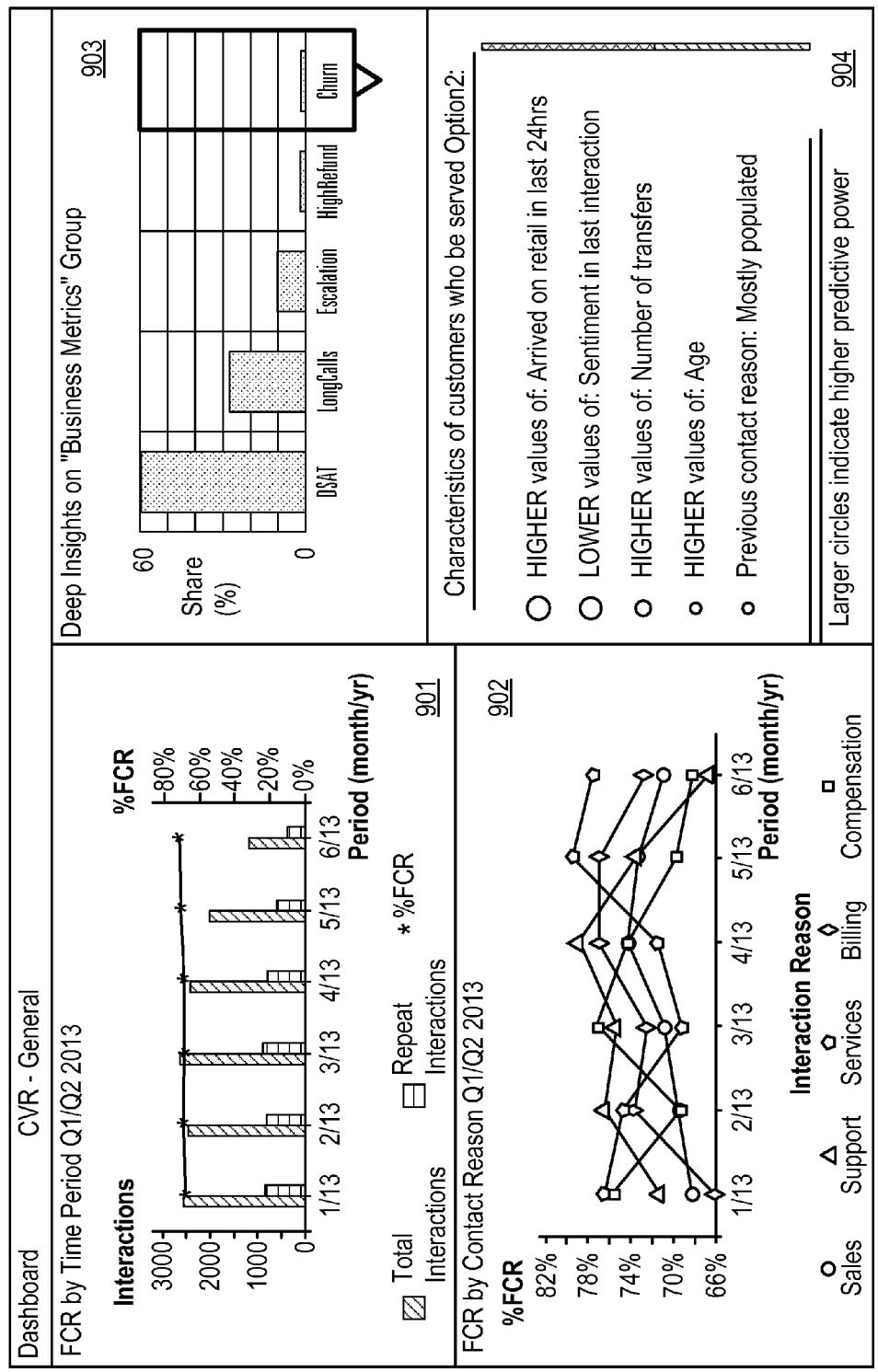
FIG. 9 is an example screenshot that may be presented to a user according to some embodiments of the invention.
Figure 10:
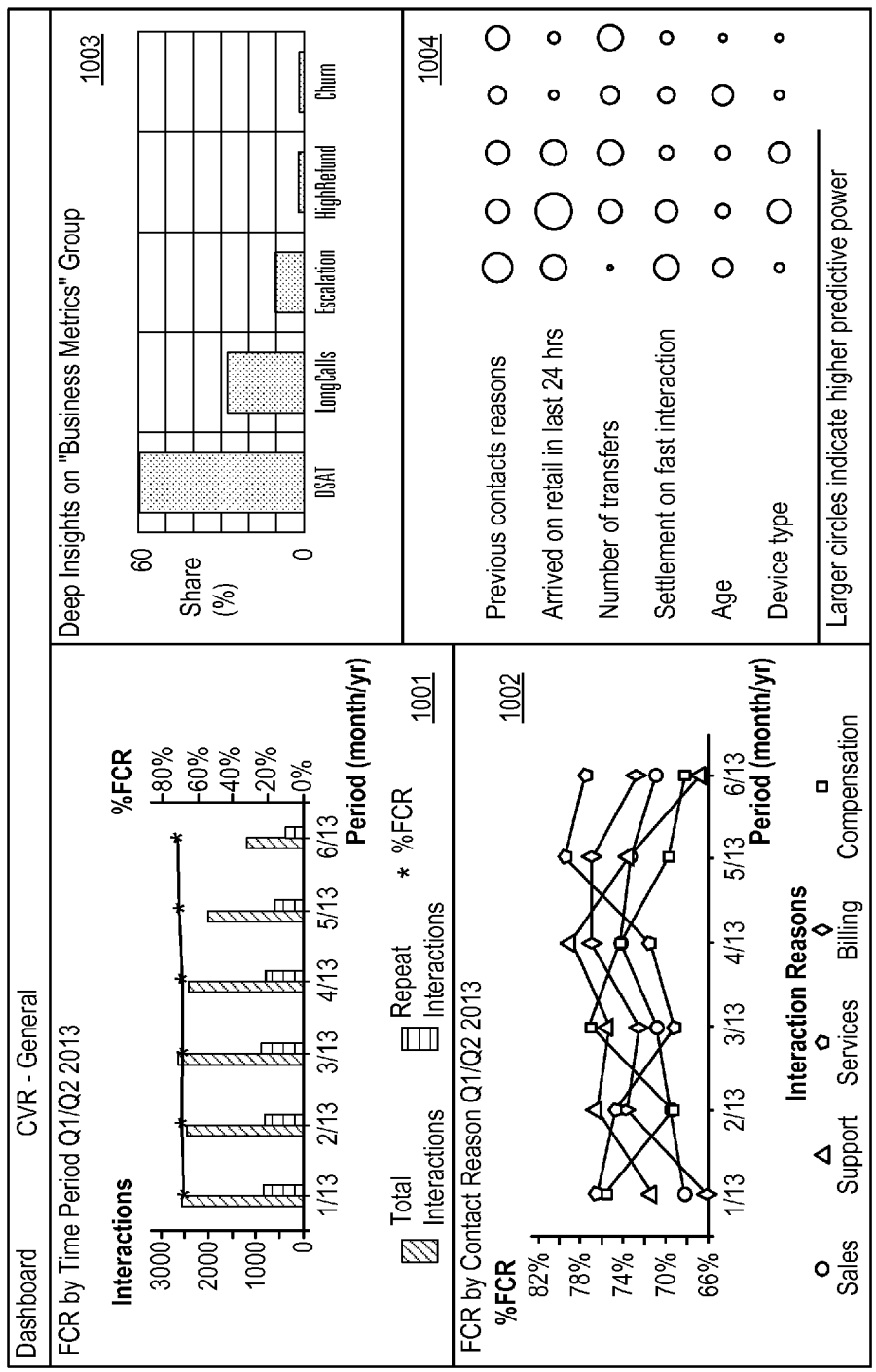
FIG. 10 is an example screenshot that may be presented to a user according to some embodiments of the invention.

FIGS. 9 and 10 are example screenshots, similar to FIGS. 5 and 6, for a "deep insight" process. For this process, a set of calls has been categorized by a number of business metrics. Thus for example there may be a data record relating to each call. In the example of FIG. 9, the variable of interest is one of a general category called call volume reduction, CVR, a term used in call centers. The bar chart 901 in FIG. 9 at the top left examines first call resolution, FCR, by time period. The scale on the left shows total interactions and repeat interactions, from which it is possible to determine what percentage of the interactions did not require a repeat call and were therefore resolved in the first call. The line graph is according to the scale on the right which shows FCR rates as a percentage of total interactions.

The graph 902 at the bottom right of FIG. 9 shows percentage FCR figures broken down by contact or interaction reason. The reasons shown are sales, support, service, billing and compensation. These are examples of independent variables.

The chart 903 in FIG. 9 is similar to bar chart 601 in FIG. 6 and shows the distribution of various business metrics. When a user clicks on one of the bars in the bar chart 901 the list of insight snippets 904 is displayed. These show the relationship between a particular value "churn" for the variable of interest and independent variables such as:

Arrival on retail site in last 24 hours
Sentiment in last interaction
Number of transfers (e.g. from one caller to another)
Age
Previous contact reason.

In FIG. 10, items 1001 and 1002 are the same as items 901 and 902 in FIG. 9. Here the relationship between various values for the variable of interest, which may be various business metrics, and independent variables is shown using circles of different sizes for predictive power. Here an additional independent variable is included, namely:

Device type (used for interaction e.g. mobile, tablet, lap top computer).

Embodiments of the invention may include an article such as a computer or processor non-transitory or transitory computer readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 720, computer-executable instructions such as executable code 725 and a controller such as controller 705 may carry out embodiments of the invention.

Unless explicitly stated, the method embodiments described herein are not constrained to a particular order or sequence. Additionally, some of the described method embodiments or elements thereof can occur or be performed at the same point in time.

The aforementioned flowcharts and block diagrams illustrate the architecture, functionality, and operation of possible implementations of systems and methods according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Any of the functions of the individual blocks of the block diagram may be combined in a single computing module or separated into more than one computing module. It will also be noted that each block of the block diagrams and/or flowchart illustrations, and combinations of blocks in the block diagrams and/or flowchart illustration, can be implemented by special purpose hardware-based systems that perform the specified functions or acts, or combinations of special purpose hardware and computer instructions.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A computer implemented method of analysing a set of data records, wherein each data record comprises a value for each of a plurality of variables, the method comprising:
   using one or more computer processors:
   receiving a selection of a variable of interest from the plurality of variables;
   analysing values in the data records of at least one variable of the plurality of variables other than the variable of interest by determining whether the at least one variable is correlated with the variable of interest and for each variable determined to be correlated with the variable of interest, determining the strength of the correlation;
   using the analysis to create a statistical description of said at least one variable;
   for one or more rules corresponding to the at least one variable, applying the rule to the plurality of variables;
   for each rule having conditions of the rule met by the plurality of variables, choosing a template corresponding to the rule;
   using the statistical description to populate the one or more templates corresponding to a rule, the templates populated for one or more variables other than the variable of interest, each template including a natural language description of a relationship between the variable of interest, or a value or range of values of the variable of interest, and the variable to which the statistical description applies; and
   displaying the one or more populated templates including natural language descriptions for one or more of the variables, together with information relating to the strength of the correlation.

2. The method of claim 1 wherein said analysing is carried out on multiple variables other than the variable of interest and wherein at least one said template natural language description is populated for respective ones of said multiple variables.

3. The method of claim 1 wherein the populated natural language descriptions are presented as a list ranked by strength of correlation.

4. The method of claim 1 wherein said analysing is carried out on multiple variables other than the variable of interest and wherein multiple rules are available for at least one of the multiple variables.

5. The method of claim 1 in which each template comprises a natural language description and one or more placeholders, each placeholder to be populated with names of one or more of the plurality of variables and values of one or more of the plurality of variables.

6. The method of claim 1 comprising allocating the data records to respective groups, each group corresponding to a different value or range of values of the variable of interest, wherein the creation of a statistical description is performed for at least one of the respective groups.

7. The method of claim 1 comprising allocating the data records to respective groups, each group corresponding to a different value or range of values of said variable other than the variable of interest, wherein the creation of a statistical description is performed for at least one of the respective groups.

8. A system for the analysis of data records, each data record comprising a value for a plurality of variables, the system comprising:
  one or more processors configured to:
  allocate the data records to respective groups, each group corresponding to a different value or range or values of a variable of interest;
  analyse the data records and determine whether any of the plurality of variables other than the variable of interest is correlated with the variable of interest;
  determine the strength of correlation for each variable determined to be correlated with the variable of interest; and
  for at least one group, create a statistical description of at least one variable of the plurality of variables other than the variable of interest;
  for one or more rules corresponding to the at least one variable, applying the rule to the plurality of variables;
  for each rule having conditions of the rule met by the plurality of variables, choosing a template corresponding to the rule; and
  use the statistical description to populate the one or more templates corresponding to a rule, the templates populated for one or more variables other than the variable of interest, each template including a natural language description of a relationship between the variable of interest and the variable to which the statistical description applies; and
  display the one or more populated templates including natural language descriptions for one or more of the variables used to populate the templates, together with information relating to the strength of the correlation.

9. The system of claim 8 wherein the one or more processors are configured to
  carry out said creation of a statistical description for one or more variables which are correlated with the variable of interest.

10. The system of claim 8 in which each template comprises a natural language description and one or more placeholders, each placeholder to be populated with names of one or more of the plurality of variables and values of one or more of the plurality of variables.

11. The system of claim 8 further comprising an interface configured to receive a selection of a variable of interest from the plurality of variables.

* * * * *